ature limits of operation are not overly critical so long as a substantial amount of water is still in the liquid phase during the reaction to effect efficient contact between the reactants. The reactor should of course be capable of withstanding the pressure developed. The amount of sodium hydroxide or sodium fluoride to be added may vary considerably. However, for the most satisfactory results, the addition of these agents should be limited to about 0.1 to 5.0% by weight of the starting materials. The sources of calcium oxide and silicon dioxide may be varied so long as they are relatively pure. A variation of the CaO/SiO₂ mol ratio can exist from about 1.5 to 2.2; however, the formation of dicalcium silicate alpha hydrate is at a maximum around 2:1.

United States Patent Office

3,131,024
METHOD OF PRODUCING DICALCIUM SILICATE ALPHA HYDRATE

James P. Leineweber, Somerville, N.J., assignor to Johns-Manville Corporation, New York, N.Y., a corporation of New York
No Drawing. Filed Mar. 22, 1961, Ser. No. 97,457
4 Claims. (Cl. 23—110)

This invention relates to a process for the manufacture of hydrated calcium silicates. More particularly, the invention relates to a process for the manufacture of dicalcium silicate alpha hydrate. Still more particularly, the invention relates to a process for the manufacture of dicalcium silicate alpha hydrate wherein substantially no additional materials or contaminants are formed. The product obtained has found very effective use as a flatting agent for clear lacquers.

HISTORY

Because of its importance in the curing of Portland cements and other fields, the calcium oxide-silicon dioxide-water system has received considerable attention in the technical fields during the past several decades. Several different methods have been devised whereby synthetic calcium silicates are commercially produced. The two most prominent methods of synthesis are the precipitation method and the hydrothermal method. The former method generally results in the production of an amorphous type calcium silicate and is accomplished by reacting a calcium salt such as calcium chloride with a water solution of an alkali silicate such as sodium silicate. A precipitated calcium silicate results.

On the other hand, several crystallographically different hydrated calcium silicate phases have been prepared by hydrothermal methods of synthesis. This reaction is effected under high temperature by causing a CaO source, such as lime, to react with a SiO₂ source, such as diatomaceous earth, in the presence of water. Compounds covering calcium oxide to silicon dioxide ratios of 0.5 to 3.0 have been produced by the many workers in this field. When lime and silica (amorphous or crystalline) are reacted at a CaO/SiO₂ mol ratio of 2 with an excess of water in the temperature range of 180° C. to 300° C., only one thermodynamically stable phase is formed. This phase is identical in all properties to the mineral hillebrandite and has the composition 2CaO·SiO₂·H₂O. It is also properly considered to have the formula Ca₂(SiO₃OH)OH.

Another thermodynamically unstable phase having essentially the same chemical composition as hillebrandite was discovered as a by-product in Portland cement which had been steam cured in the temperature range of 150 to 175° C. This phase is entirely different from the mineral hillebrandite in its optical properties and has an X-ray diffraction pattern different from any other hydrated calcium silicate. This phase has been given the name dicalcium silicate alpha hydrate. The resulting structure can be described as orthorhombic prisms which are colorless and transparent with a luster.

Since the time of its discovery, various workers have demonstrated that the alpha hydrate can be prepared in good yields by hydrolysis of beta calcium silicate, 2CaO·SiO₂, over a temperature range of 140 to 200° C. They have also shown that the hydrolysis of tricalcium silicate, 3CaO·SiO₂, over the temperature range of 120 to 200° C. gives mixtures of calcium hydroxide and dicalcium silicate alpha hydrate.

However, to my knowledge no one has to this date succeeded in preparing the alpha hydrate in good yield by the direct hydrothermal reaction of silicon dioxide, in any of its physical forms, with calcium hydroxide. One attempt has been recorded using a lime to silica ratio of 2:1 at a temperature of 200° C., but the time consumed amounted to 28 days and with the result that only a trace of dicalcium silicate alpha hydrate was formed in addition to several other products.

OBJECTS

It is therefore the primary object of this invention to provide a method of hydrothermally producing dicalcium silicate alpha hydrate whereby good yields are obtained.

It is a further object of this invention to provide a method of efficiently producing dicalcium silicate alpha hydrate in a substantially uncontaminated condition.

It is still another object of this invention to provide a method of producing dicalcium silicate alpha hydrate under controlled reaction conditions whereby the production of other hydrated calcium silicates is reduced to a minimum.

It is another object of this invention to provide a dicalcium silicate alpha hydrate which possesses properties useful in commercial applications.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

BRIEF DESCRIPTION OF INVENTION

It has been discovered that the production of substantially pure alpha hydrate calcium silicate is effected when the hydrothermal reaction of calcium hydroxide and silica is carried out in the presence of a small amount of sodium hydroxide or sodium fluoride.

The use of sodium hydroxide or sodium fluoride to promote the formation of the metastable phase of the dicalcium alpha hydrate is believed to be unique in the art. Heretofore reagents of this type have been considered to be simple catalysts which had no influence on the product which would be formed.

It has been further determined that the various reaction conditions, e.g., temperature, mol ratio, etc., may be controlled within preferred ranges to give the most favorable formation of the end-product.

DETAILED DESCRIPTION OF INVENTION

Work was carried out in the laboratory to determine the proper reaction conditions to produce substantial yields of dicalcium silicate alpha hydrate. The CaO/SiO₂ mol ratio was varied over the range of about 1.5 to about 2.2 and temperatures employed above about 180° C. In so reacting these two basic constituents, the alpha hydrate form always appeared among the final reaction products but only in minor amounts. Further, even at a mol ratio of exactly 2:1, the compound, although always present, was always contaminated with other hydrated calcium silicates.

Work was then conducted in accordance with the instant invention, wherein small amounts of sodium hydroxide or sodium fluoride were added to the hydrothermal mixture of silica and calcium oxide containing materials. This new reaction produced surprising results in that the final product was a substantially uncontaminated alpha hydrated calcium silicate.

With regard to the reaction conditions used, temperatures above 180° C. with corresponding reaction times up to about 4 hours are preferred. Higher temperatures result in a faster reaction rate with the upper limits being set by the pressure which the reactor can withstand. The $CaO/SiO_2$ mol ratio is preferably within the range of 1.8:2.2 to produce the least contaminated product.

Various sources of the reactants can be used. With regard to the silicon dioxide, any siliceous-like material which contains substantial amounts of silica that is capable of reacting with an alkaline earth hydroxide is applicable. Examples of such materials are silica sand, silica gel, diatomaceous earth, or the like. The amorphous type of the silica is preferred, however, because of its higher reactivity. The usual source of the calcium hydroxide is lime, but other materials which will produce calcium hydroxide in its reaction with silica may be used. Such materials include quick lime, wet or dry slaked lime, etc.

The sodium hydroxide or sodium fluoride may be added in amounts of between about 0.10 to 10.0% or more by weight of the reactants with due consideration being given when higher amounts are employed to side reactions and the possibility of contaminants. I have found about 2.0% to about 3.0% by weight of the reactants to be effective as well as practical.

As the initial step in the process, finely divided lime and silica are suspended in at least enough water to form a pumpable slurry. The lime and silica may be suspended individually or they may be blended before pumping into the reaction vessel. The sodium hydroxide or sodium fluoride may be added with either of the components or it may be added individually. Likewise mixtures of the two may be used.

The following examples illustrate the invention:

*Example I*

A slurry of silica was prepared by mixing finely ground diatomaceous earth with water so that the slurry contained 0.87 lb. solids per gallon. A slurry of hydrated lime was prepared by mixing hydrated lime with water so that the slurry contained the equivalent of 1.41 lbs. of CaO per gallon. The lime slurry also contained 48 lbs. of NaOH per 1000 lbs. of CaO. One thousand two hundred and fifty-eight gallons of the diatomaceous earth slurry were pumped into the reactor where it was heated by direct injection of steam. Water was used to flush the feed lines. Then 1488 gallons of the lime slurry were pumped into the reactor, likewise followed by water to flush the lines. The reaction vessel was continually agitated and held at the desired temperature of 323° C. by injection of steam. The slurry was reacted for one hour and ten minutes at 232° C. and then discharged through a cooling system into an appropriate collecting tank. The solids were filtered from the slurry and then air dried and ground. The finished product was identified as dicalcium silicate alpha hydrate by X-ray diffraction and had the following physical properties:

| | |
|---|---|
| Bulk density | 13.7 lb./ft. |
| Gardner-Coleman water adsorption | 135%. |
| pH of 10% slurry | 10.8. |
| Wet density | 28.3 lb./ft. |

The example was rerun using sodium fluoride with substantially the same results.

It should be appreciated that the procedure outlined in Example I in no way limits the invention to these particular conditions. Alternative methods of heating and order of addition of the reactants to the reactor could have been used. Basically, the process requires that the proper amounts of hydrated lime and reactive silica be reacted in a water medium at the desired temperature for the required period of time.

The dicalcium silicate alpha hydrate which is produced by the process described in Example I shows good performance as a flatting agent for furniture lacquers. This application is illustrated by Example II.

*Example II*

One hundred grams of the dicalcium silicate alpha hydrate, as prepared in Example I, were mixed with a sufficient quantity of a clear nitrocellulose lacquer base to give 100 g. of vehicular solids. Sufficient lacquer thinner was added to thin the mixture to a viscosity of about 1000 centipoises. This mixture was ground in a ball mill until the dicalcium silicate alpha hydrate had reached a Hegman fineness of 6½. After grinding, sufficient clear lacquer base was added to reduce the amount of dicalcium silicate alpha hydrate to 10% by weight of the lacquer vehicular solids. Sufficient thinner was then added to reduce the flatted lacquer to spraying viscosity (50 centipoises). The formulation was then sprayed on a test panel and dried in the usual manner.

After drying, the lacquer film was found to have satisfactory transparency and gave a Gardner 60° specular gloss reading of 15. The lacquer was tested without the dicalcium silicate alpha hydrate and gave a Gardner reading of between 50 and 60 with a perfect mirror reading being 100.

It is believed the above provides a complete description of the invention in such manner as to distinguish it from other inventions and from what is old, and provides a description of the best mode contemplated of carrying out the invention and thereby complies with the patent statutes.

It is also to be understood that in accordance with provisions of the patent statutes, variations and modifications of the invention, as illustrated by specific examples herein, may be made without departing from the spirit of the invention. It is to be understood that the scope of the invention is not to be interpreted as limited to the specific embodiments disclosed herein but only in accordance with the appended claims, when read in the light of the foregoing description.

What I claim is:

1. A method of producing dicalcium silicate alpha hydrate which comprises providing a mixture of silicon dioxide and a calcium oxide producing material wherein the $CaO:SiO_2$ ratio is about 1.5 to about 2.2, said mixture additionally containing between about 0.1 to about 10.0% by weight of the above ingredients a compound selected from the group consisting of sodium hydroxide and sodium fluoride, and thereafter hydrothermally reacting said silicon dioxide and calcium oxide producing material at a temperature above about 180° C.

2. A method as claimed in claim 1 wherein said compound is sodium hydroxide.

3. A method as claimed in claim 1, wherein said compound is sodium fluoride.

4. A method as described in claim 1 wherein about 2 to about 3% by weight of the reactants of said compound is employed.

References Cited in the file of this patent

UNITED STATES PATENTS

| | | |
|---|---|---|
| 2,361,515 | Weidlich | Oct. 31, 1944 |
| 2,665,996 | Kalousek | Jan. 12, 1954 |

OTHER REFERENCES

Flint et al.: "Nat. Bur. of Stds. J. of Research" 21, 617–638 (1938), R.P. 1147.

McMurdie: "Nat. Bur. of Stds. J. of Research" 31, 225–228 (1943), R.P. 1560.

Heller et al.: "J. Chem. Soc." (London), pages 2535–2541, 1952.

Assarsson: "J. Phys., Chem." 62, 223–8 (1958).

UNITED STATES PATENT OFFICE
CERTIFICATE OF CORRECTION

Patent No. 3,131,024                              April 28, 1964

James P. Leineweber

It is hereby certified that error appears in the above numbered patent requiring correction and that the said Letters Patent should read as corrected below.

Column 3, line 45, for "323° C." read -- 232° C. --.

Signed and sealed this 8th day of September 1964.

(SEAL)
Attest:

ERNEST W. SWIDER                              EDWARD J. BRENNER
Attesting Officer                                    Commissioner of Patents